(12) United States Patent
Boutaghou et al.

(10) Patent No.: US 6,285,651 B1
(45) Date of Patent: Sep. 4, 2001

(54) OPTICAL DISC FOR OPTICAL STORAGE SYSTEM

(75) Inventors: Zine-Eddine Boutaghou, Vadnais Heights; Mary Cynthia Hipwell, Minneapolis, both of MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/077,842

(22) PCT Filed: Jun. 2, 1998

(86) PCT No.: PCT/US98/11140
§ 371 Date: Feb. 15, 2000
§ 102(e) Date: Feb. 15, 2000

(87) PCT Pub. No.: WO98/55999
PCT Pub. Date: Dec. 10, 1998

Related U.S. Application Data
(60) Provisional application No. 60/048,380, filed on Jun. 3, 1997.

(51) Int. Cl.[7] .................. G11B 23/00; G11B 25/04
(52) U.S. Cl. ............................. 369/270; 369/282
(58) Field of Search ................. 369/282, 264, 369/270, 271; 360/135, 99.12

(56) References Cited

U.S. PATENT DOCUMENTS

| | | | |
|---|---|---|---|
| 4,710,913 | * 12/1987 | Matsushima et al. | 369/280 |
| 4,911,968 | * 3/1990 | Higasihara et al. | 428/64.4 |
| 5,167,996 | * 12/1992 | Kurisu et al. | 428/65.1 |
| 5,265,086 | * 11/1993 | Ota et al. | 369/284 |
| 5,273,598 | * 12/1993 | Higasihara et al. | |
| 5,323,381 | * 6/1994 | Takahashi | 369/282 |
| 5,504,735 | * 4/1996 | Ota et al. | 369/282 |
| 5,572,509 | * 11/1996 | Kobayashi et al. | 369/290 |

FOREIGN PATENT DOCUMENTS

| | | | |
|---|---|---|---|
| 0 566 032 A2 | * 10/1993 | (EP) | . |
| 61-289557 | * 12/1986 | (JP) | . |
| 2-260184 | * 10/1990 | (JP) | . |
| 3-096311 | * 4/1991 | (JP) | . |
| 4-121843 | * 4/1992 | (JP) | . |
| 4-289571 | * 10/1992 | (JP) | . |
| 6-215517 | * 8/1994 | (JP) | . |
| 8-011165 | * 1/1996 | (JP) | . |

* cited by examiner

*Primary Examiner*—William Klimowicz
(74) *Attorney, Agent, or Firm*—Thomason, Moser & Patterson, LLP

(57) ABSTRACT

An optical disc storage system (10) includes an optical disc (12) having a data surface (70) and a transducing element (30) adjacent the data surface (70). An actuator (22) coupled to the transducing element (30) positions the transducing element (30) relative to the data surface (70). The system (10) includes a spindle motor (90) and a controller (34) coupled to the transducing element (30), the actuator (22) and the spindle motor (90) for reading and writing information on the data surface (70). A hub insert (72) is coupled to the optical disc (12) and has a stiffness which is greater than a stiffness of the optical disc (12). An attachment mechanism (94, 96, 98) couples the hub insert (72) to the spindle motor (90) and stress due to the attachment mechanism (94, 96, 98) remains substantially in the hub insert (72) to thereby limit stress applied to the optical disc (12) and the resultant distortion of the optical disc (12).

18 Claims, 3 Drawing Sheets

OPTICAL DISC FOR OPTICAL STORAGE SYSTEM

CROSS REFERENCE TO RELATED APPLICATION

This application is based on U.S. Provisional Application Serial No. 60/048,380 filed Jun. 3, 1997, assigned to the assignee of this application and incorporated herein by reference.

FIELD OF THE INVENTION

The present invention relates to optical storage systems. More particularly, the present invention relates to optical discs used in such systems.

BACKGROUND OF THE INVENTION

Disc storage systems are known in the art and are used to storage information for later retrieval. Such disc storage systems include a rotating disc which carries information thereon. A transducing head (or, in some instances, a readback head) is positioned over a surface of the disc while the disc rotates at high speed. The head is carried on a slider which is designed to "fly" just over the surface of the rotating disc. The head may then be used to write information onto the disc, or read information from the disc. Such information may be, for example, magnetically encoded on the disc surface.

Increased storage density is becoming increasingly important. Optical data storage systems are a promising technology for storing large quantities of information. The information is accessed by focussing the laser beam or other light source onto a data surface of the disc and analyzing light reflected from or transmitted through the data surface. In general, in optical storage systems, data is in the form of marks carried on the surface of the discs which are detected using the reflected light. There are a number of different optical disc technologies which are known in the industry. For example, compact discs are currently used to store digital data such as computer programs or digitized music. Typically, compact discs are permanently recorded during manufacture. Another type of optical disc is a write-once read-many (WORM) system in which a user may permanently write information onto a blank disc. Other types of systems are erasable such as phase change and magneto-optic (M-O) systems. Phase change systems detect data by sensing a change in reflectivity. M-O systems read data by measuring the rotation of the instant light polarization due to the storage medium.

In order to increase storage density, the transducing head must be positioned very close to the disc surface, for example, on a slider which flies over the disc surface. Further density improvements may be obtained by coupling, the light to the disc surface using the near field, as opposed to the traditional far field technique. Such near field recording is described in U.S. Pat. No. 5,125,750 to Corle et al. which issued Jun. 30, 1992 and in U.S. Pat. No. 5,497,359 to Mamin et al. which issued Mar. 5, 1996. These optical recording systems use a solid immersion lens (SIL) which is carried on a slider and positioned just over the disc surface for near field recording. With recording at such high density and with the transducing head in such close proximity to the optical disc, even slight variations in this precise configuration can lead to recording errors or head crashes.

SUMMARY OF THE INVENTION

The present invention provides an optical disc storage system having an optical disc with a data surface. A transducing element is, positioned adjacent the data surface of the optical disc. An actuator coupled to the transducing element positioning the transducing element relative to the data surface. The system also includes a spindle motor and a controller coupled to the transducing element, the actuator and the spindle motor for reading and writing information onto the data surface. A hub insert is coupled to the optical disc and has a stiffness which is greater than the stiffness of the optical disc. An attachment mechanism couples the hub insert to the spindle motor whereby stress from the attachment mechanism remains substantially in the hub insert to thereby limit distortion in the shape of the optical disc. Another aspect of the present invention includes making such an optical disc and hub insert including placing the hub insert in a mold for the optical disc and injection molding the optical disc with the hub insert in the mold whereby the hub insert is formed integrally with the optical disc.

DETAILED DESCRIPTION OF A PREFERRED EMBODIMENT

The present invention includes an optical data storage disc having a hub insert in an optical storage device. The hub insert provides increased stiffness where the hub is clamped to the spindle motor of the device. Stress applied by the clamp is largely limited to the hub and is not transferred to the optical disc. This reduces runout and, because the disc rotates substantially in a single plane, reduces the minimum fly height of the optical transducing element. This leads to increased storage densities. One aspect of the present invention includes the manufacture of such a disc.

Figure 1:
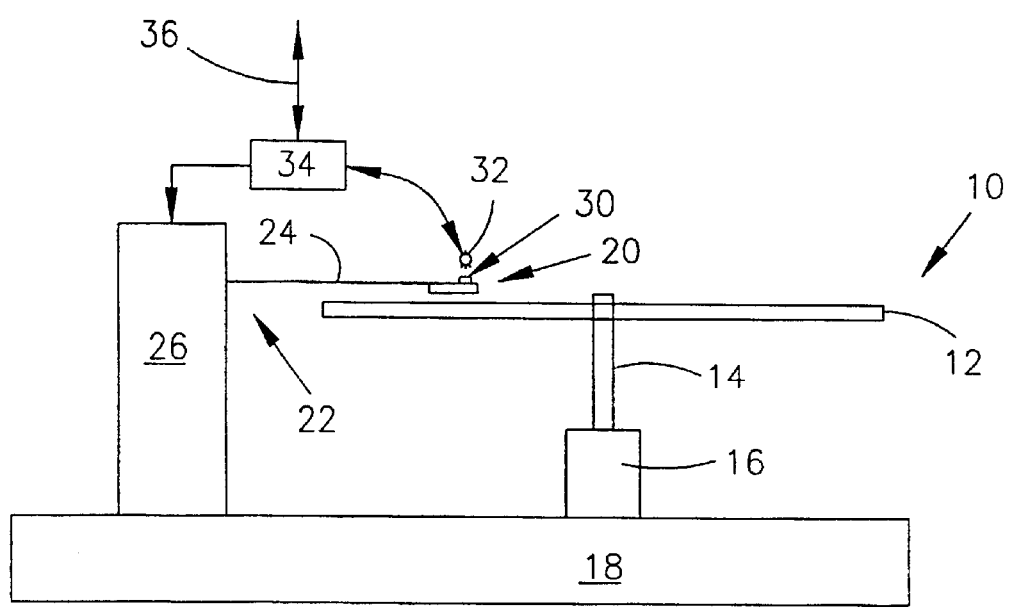
FIG. 1 is a simplified diagram of an optical disc data storage system in accordance with the present invention.

FIG. 1 is a simplified illustration of an optical recording system 10 employing a slider in accordance with the present invention. System 10 includes optical disc 12 having a data surface which carries optically encoded information. Disc 12 rotates about spindle 14 and is driven by a spindle motor 16 mounted on base 18. A slider 20 is positioned proximate disc 12 and is coupled to an actuator 22 which includes armature 24 and actuator motor 26 which couples to base 18. Slider 18 includes an optical transducer 30. An optical source/sensor apparatus 32 is positioned proximate transducer 30 and is optically coupled to transducer 30. A controller 34 couples to apparatus 32, actuator 26 and data bus 36 and is used for controlling operation of system 10. Preferably, transducer 30 operates by coupling to the disc 12 using the near field (or "evanescent field"). For example, a Solid Immersion Lens (SIL) may be used as described in U.S. Pat. No. 5,125,750 to Corle et al. Which issued Jun. 30, 1992 and in U.S. Pat. No. 5,497,359 to Mamin et al. which issued Mar. 5, 1996.

During operation, disc 12 rotates and slider 20 is positioned radially along the data surface of disc 12 using actuator 22. Controller 34 controls the position of slider 20, whereby information may be read from the data surface of disc 12 using optical source/sensor apparatus 32 and transducer 30 and received or transmitted over data bus 36.

Typical prior art media for magneto-optic storage systems are made of a polycarbonate material with a relatively low modulus of elasticity. Typically, the modulus elasticity of the disc is an order of magnitude lower than the aluminum substrate used to mount or clamp the disc to the spindle motor. The metal substrate on to which the disc is clamped must be precisely machined in order to ensure that the optical disc is flat and planar. However, the clamping force applies a stress to the polycarbonate material which causes the shape of the disc to distort. Testing of polycarbon magneto-optic media indicates substantial excitations and large axial runout even at low frequencies. One aspect of the present invention includes the recognition that the stretch from clamping distorts the shape of the disc and thereby increases the runout. This reduces the fly height at which slider 20 can fly over disc 12.

The invention provides a hub insert which is stiffer than the optical disc and has a relatively low susceptibility to distortion due to the clamping force. Stress that is applied to the insert remain relatively isolated in the hub insert and are not transferred to the optical disc. Another aspect of the present invention is a technique for making such an optical disc with a hub insert and various configurations for the hub insert.

Figure 2:
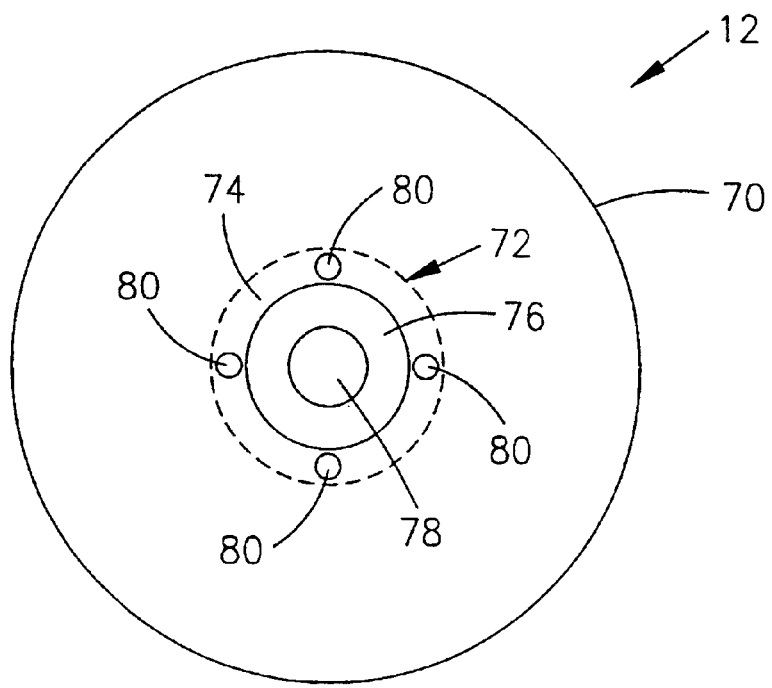
FIG. 2 is a top plan view of an optical disc, and hub insert in accordance with the invention.

FIG. 2 is a top plan view of optical disc 12 having data storage regions 70 and hub insert 72. Portion 74 of hub insert 72 is imbedded in data storage region 70 and portion 76 of hub 72 is exposed. Hub insert 72 is located in the center of data storage region 70 and includes axial opening 78 formed therein. Clamping holes 80 are preferably spaced substantially equidistantly around axial opening 78. In the embodiment shown in FIG. 2, four clamping holes are shown, however any number or configuration may be used as desired.

Figure 3:
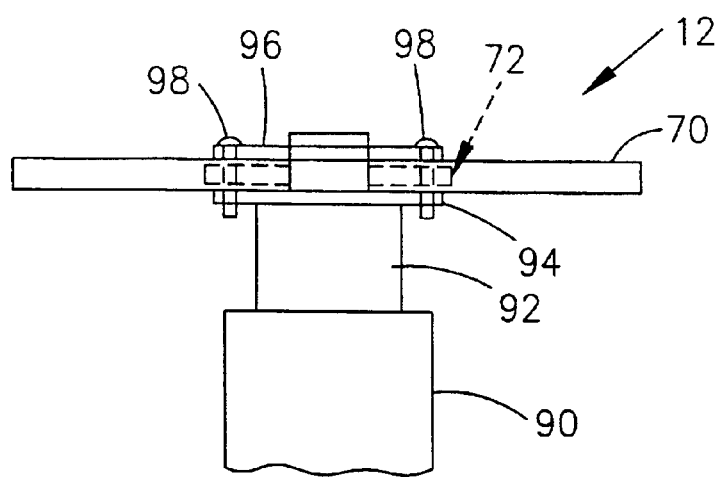
FIG. 3 is a side plan view of the optical disc of FIG. 2 coupled to a spindle motor.

FIG. 3 is a side plan view of disc 12 coupled lo spindle motor 90. Disc 12 couples to spindle motor 90 through drive shaft 92 received through axial opening 78 and is supported by substrate clamp 94 which is positioned proximate hub insert 72. Upper clamp 96 is positioned opposite substrate clamp 94. Clamps 94 and 96 and spindle drive shaft 92 are aligned with the central axis of disc 12. Connectors 98 are received through clamp holes 80 and extend completely through disc 12 to thereby apply a clamping force to disc 12 between clamps 94 and 96, As illustrated in FIG. 3, clamps 94 and 96 are substantially aligned with hub insert 72 whereby forces due to clamping are transmitted substantially only to hub insert 72. As described above, because hub insert 72 is relatively stiff and does not substantially bend or deform, the stresses due to clamping are not transmitted to data storage region 70. Clamps 94 and 96 and connectors 98 form an "attachment mechanism" or "clamping mechanism" as used herein. However, this is simply one illustration of such a mechanism and the invention is intended for use with any type of clamping mechanism which could impart a stress or otherwise cause a deformation of an optical disc, particularly those used in near field type systems.

Figure 4:
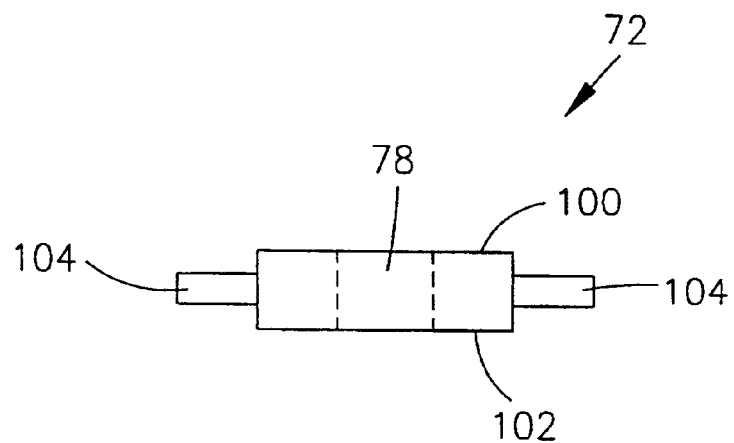
FIG. 4 is a side plan view of the hub insert of FIG. 1.

FIG. 4 is a side plan view of hub insert 72. Hub insert 72 includes clamping surface 100 and 102 having axial opening 78 extending therebetween. Hub insert 72 also includes radially extending holes 104 which enhance the adherence of the polycarbon material of the data region 70 to hub insert 72. Holes 104 are but one example of a technique to couple hub 72 to data region 70 and any appropriate technique may be employed. In general, it is preferable to have portions of hub 72 extending radially through data region 70 to improve the coupling therebetween and increase the surface area over which such coupling occurs.

Figure 5:
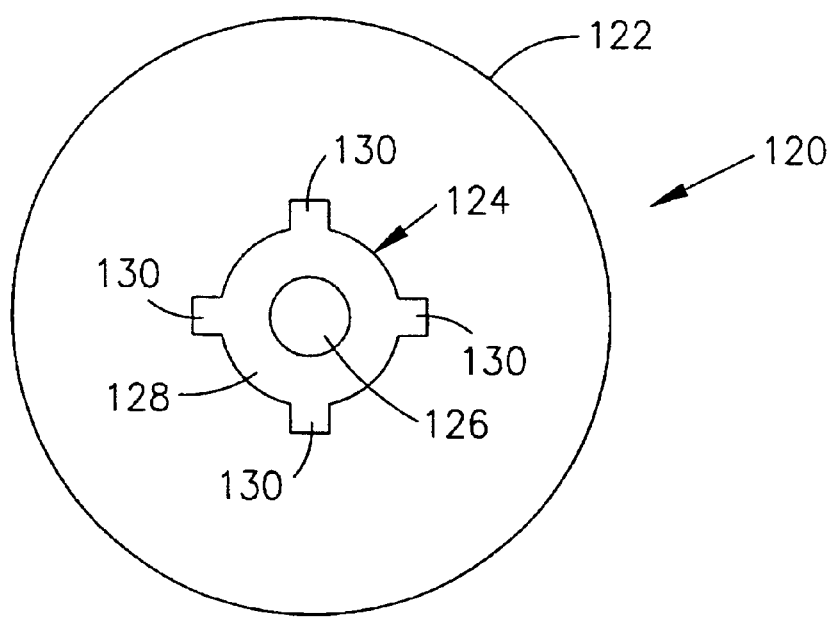
FIG. 5 is a top plan view of an optical disc having a hub insert in accordance with another embodiment.

FIG. 5 shows a top plan view of an optical disc 120 in accordance with another embodiment. Disc 120 includes data region 122 and hub insert 124. In the embodiment of FIG. 5, hub insert 124 includes axial opening 126, central clamping region 128 and radially extending wings 130. Wings 130 provide additional coupling between hub 124 and data region 122 and disperse rotational forces from spindle motor 90 into data region 122.

Another aspect of the present invention is the manufacture of an optical disc having a hub insert. The hub insert may be placed into a mold used to form the optical disc. For example, a hub insert such as hub insert 72 or 124 may be placed into a mold of the type used for injection molding. The mold is then sealed and the material used to form the data region is injected into the mold. For example, this material may be of polycarbon, polyester or any appropriate material used for optical recording. The injected material flows around the hub whereby the hub i!; bonded thereto. When the injected material hardens the complete unit may be removed. The additional surface area provided by radial extending wings 130 or holes 104 provide better coupling between the hub and the injected material used to provide the data region. Following the injection molding process, the mold is removed to provide, the completed disc.

The present invention offers an easily implemented manufacturing process for producing an optical disc having reduced runout and improved stability. The injection molding process provides a "stress free" attachment technique. This also allows decoupling of the design of the hub from the design and configuration of the injection mold process. Thus, the hub can be designed for optimal coupling and clamping, while the data region can be designed for optimal recording. The data region may be formed using any appropriate material. The hub insert is preferably of a material that is stiffer than the material of the data region. Some preferred materials include metal, ceramic or glass which all provide high stiffness with a low susceptibility to distortion from the clamping process. The reduced runout of the present invention is particularly well suited for optical recording implementations which rely on near field optical coupling techniques such as those used with a SIWL. Such optical recording techniques require the optical head to be placed in a very near proximity to the data surface, for example the head must fly on a slider, and such close spacing is incompatible with even a small amount of runout as is present in prior art optical discs.

Although the present invention has been described with reference to preferred embodiments, workers skilled in the art will recognize that changes may be made in form and detail without departing from the spirit and scope of the invention.

What is claimed is:

1. An optical disc storage system, comprising:
   an optical disc having an optical data surface;
   a transducing element adjacent the optical data surface of the optical disc for optically coupling to the data surface.
   an actuator coupled to the transducing element to position the transducing element relative to the data surface;
   a spindle motor;
   a controller coupled to the transducing element, the actuator and the spindle motor for reading and writing information onto the optical data surface;
   a hub insert coupled to the optical disc, the hub insert having a stiffness which is greater than a stiffness of the optical disc; and an attachment mechanism which includes the hub insert and comprises a plate of greater stiffness than the disc extending partially radially through the disc coupled to the optical disc thereby coupling the hub insert to the spindle motor whereby stress from the attachment mechanism is located substantially in the hub insert to thereby limit distortion of the optical disc.

2. The optical disc storage system of claim 1 wherein the hub insert comprises metal.

3. The optical disc storage system of claim 1 wherein the hub insert comprises glass.

4. The optical disc storage system of claim 1 wherein the hub insert comprises ceramic.

5. The optical disc storage system of claim 1 wherein the optical disc comprises polycarbonate.

6. The optical disc storage system of claim 1 wherein the hub insert includes a plurality of radially extending members which extend in to the optical disc and provide coupling therebetween.

7. The optical disc storage system of claim 1 wherein the attachment mechanism includes a metal plate coupled to the optical disc.

8. The optical disc storage system of claim 7 including an elongated member coupling the metal plate to the hub insert.

9. The optical disc storage system of claim 8 wherein the elongated member extends through the hub insert and the metal plate.

10. The optical disc storage system of claim 9 wherein elongated members included in the hub insert are equidistantly spaced around a circumference of the hub insert.

11. The optical disc storage system of claim 1 wherein the transducing element couples to the optical data surface through an evanescent field.

12. The optical disc storage system of claim 11 wherein the transducing element includes a Solid Immersion Lens.

13. The optical disc storage system of claim 1 wherein the transducing element is carried on a slider which flies over the optical data surface of the optical disc.

14. The optical disc storage system of claim 1 wherein the optical disc is molded and the hub insert is carried therein.

15. The optical disc storage system of claim 14 wherein the optical disc is formed through an injection molding process.

16. The optical disc storage system of claim 15 wherein material which forms the optical disc surrounds and bonds to the hub insert.

17. An optical disc storage system, comprising:

an optical disc having an optical data surface;

a transducing element adjacent the optical data surface of the optical disc for optically coupling to the data surface;

an actuator coupled to the transducing element to position the transducing element relative to the data surface;

a spindle motor;

a controller coupled to the transducing element, the actuator and the spindle motor for reading and writing information onto the optical data surface;

means for adding stiffness to said optical disc, and an attachment means coupling the means for adding stiffness to the spindle motor to thereby limit distortion of the optical disc.

18. The optical disc storage system of claim 17 wherein the means for adding stiffness is of greater stiffness than said disc.

* * * * *